(12) United States Patent
Veltri et al.

(10) Patent No.: US 10,508,710 B2
(45) Date of Patent: Dec. 17, 2019

(54) COOLED FLYWHEEL APPARATUS HAVING A STATIONARY COOLING MEMBER TO COOL A FLYWHEEL ANNULAR DRIVE SHAFT

(71) Applicant: BC New Energy (Tianjin) Co., Ltd., Tianjin (CN)

(72) Inventors: Jeffrey A. Veltri, Burlington (CA); Cody MacNeil, Toronto (CA); Aaron Lampe, Toronto (CA)

(73) Assignee: BC NEW ENERGY (TIANJIN) CO., LTD., Tianjin (CN)

( * ) Notice: Subject to any disclaimer, the term of this patent is extended or adjusted under 35 U.S.C. 154(b) by 982 days.

(21) Appl. No.: 14/072,462

(22) Filed: Nov. 5, 2013

(65) Prior Publication Data

US 2014/0124172 A1 May 8, 2014

Related U.S. Application Data

(60) Provisional application No. 61/722,308, filed on Nov. 5, 2012.

(51) Int. Cl.
*H02K 5/00* (2006.01)
*F16F 15/30* (2006.01)
(Continued)

(52) U.S. Cl.
CPC ............ *F16F 15/302* (2013.01); *H02K 1/32* (2013.01); *H02K 5/20* (2013.01); *H02K 7/025* (2013.01); *H02K 9/19* (2013.01); *Y02E 60/16* (2013.01)

(58) Field of Classification Search
CPC .......... F16F 15/302; F16F 15/30; H02K 1/32; H02K 11/27; H02K 11/25;
(Continued)

(56) References Cited

U.S. PATENT DOCUMENTS 2,894,155 A * 7/1959 Labastie .................. H02K 9/19
188/264 D
3,514,625 A 5/1970 Lane
(Continued)

FOREIGN PATENT DOCUMENTS

AU 2004305778 A1 9/2004
AU 2011200041 A1 1/2011
(Continued)

OTHER PUBLICATIONS

EIC Search Report from STIC 2800.*
(Continued)

*Primary Examiner* — Mang Tin Bik Lian
*Assistant Examiner* — Maged M Almawri
(74) *Attorney, Agent, or Firm* — Yue(Robert) Xu; Apex Attorneys at Law, LLP

(57) ABSTRACT

A flywheel is provided with an annular drive shaft and a stationary cooling member for directing a coolant into the drive shaft annulus. Coolant pumped through the cooling member will contact the wall of the annulus to cool the drive shaft and components thermally coupled to the drive shaft. Where the flywheel has an upright axis of rotation with the annulus opening downwardly, coolant falls from the annulus to a sump positioned below the drive shaft.

14 Claims, 8 Drawing Sheets

(51) Int. Cl.
*H02K 5/20* (2006.01)
*H02K 9/19* (2006.01)
*H02K 1/32* (2006.01)
*H02K 7/02* (2006.01)

(58) Field of Classification Search
CPC .. H02K 9/16–9/197; H02K 5/20; H02K 7/02; H02K 7/025; Y02E 60/16
USPC .................. 310/52–64, 216.119, 74; 62/505
See application file for complete search history.

(56) References Cited

U.S. PATENT DOCUMENTS

| | | |
|---|---|---|
| 3,665,495 A | 5/1972 | Carter et al. |
| 3,667,012 A | 5/1972 | Kilgore |
| 3,681,628 A * | 8/1972 | Krastchew ............. H02K 9/005 310/52 |
| 3,688,140 A * | 8/1972 | Schaefer .................. F04D 3/02 310/87 |
| 4,001,666 A | 1/1977 | Grenfell |
| 4,048,528 A * | 9/1977 | Whitney .................. H02K 1/30 165/86 |
| 4,221,452 A | 9/1980 | Remington |
| 4,223,240 A | 9/1980 | Theyse |
| 4,358,937 A * | 11/1982 | Okamoto ............... H02K 9/193 277/412 |
| 4,434,393 A | 2/1984 | Kobari et al. |
| 4,511,190 A | 4/1985 | Caye et al. |
| 4,563,046 A | 1/1986 | Shimamoto |
| 4,566,740 A | 1/1986 | Beau et al. |
| 4,620,272 A | 10/1986 | Fulton et al. |
| 4,700,094 A | 10/1987 | Downer et al. |
| 4,723,735 A | 2/1988 | Eisenhaure et al. |
| 4,785,212 A | 11/1988 | Downer et al. |
| 5,030,863 A * | 7/1991 | Yoshimura ............... H02K 9/20 310/198 |
| 5,057,697 A | 10/1991 | Hammond et al. |
| 5,064,356 A * | 11/1991 | Horn ....................... F04B 39/06 417/368 |
| 5,124,605 A | 6/1992 | Bitterly et al. |
| 5,126,610 A | 6/1992 | Fremerey |
| 5,225,712 A | 7/1993 | Erdman |
| 5,245,270 A * | 9/1993 | Akiyama ............ F16C 32/0438 310/52 |
| 5,250,865 A | 10/1993 | Meeks |
| 5,329,222 A | 7/1994 | Gyugyi et al. |
| 5,449,989 A | 9/1995 | Correa et al. |
| 5,498,143 A * | 3/1996 | Dreiman ............. F04C 18/0215 184/6.18 |
| 5,541,460 A | 7/1996 | Dunfield et al. |
| 5,614,777 A | 3/1997 | Bitterly et al. |
| 5,619,083 A | 4/1997 | Dunfield et al. |
| 5,635,770 A | 6/1997 | Evans, Jr. et al. |
| 5,670,838 A * | 9/1997 | Everton .................. H02K 1/16 310/216.008 |
| 5,678,646 A * | 10/1997 | Fliege .................... B60L 11/12 180/65.1 |
| 5,699,666 A | 12/1997 | Kurten et al. |
| 5,703,423 A | 12/1997 | Fukao et al. |
| 5,708,312 A | 1/1998 | Rosen et al. |
| 5,759,589 A | 6/1998 | George, Jr. |
| 5,760,506 A | 6/1998 | Ahlstrom et al. |
| 5,760,508 A | 6/1998 | Jennings et al. |
| 5,763,971 A | 6/1998 | Takahata et al. |
| 5,780,980 A | 7/1998 | Naito |
| 5,798,633 A | 8/1998 | Larsen et al. |
| 5,821,651 A | 10/1998 | Lansberry et al. |
| 5,847,480 A | 12/1998 | Post |
| 5,886,433 A * | 3/1999 | Oda ........................ H02K 1/20 310/59 |
| 5,894,181 A | 4/1999 | Imlach |
| 5,912,519 A | 6/1999 | Horner et al. |
| 5,917,251 A | 6/1999 | Schermann et al. |
| 5,920,138 A | 7/1999 | Clifton et al. |
| 5,921,505 A | 7/1999 | Spector |
| 5,932,935 A | 8/1999 | Clifton et al. |
| 5,939,102 A | 8/1999 | George, Jr. |
| 5,942,825 A | 8/1999 | Lee |
| 5,945,754 A | 8/1999 | Fulwood et al. |
| 5,969,446 A | 10/1999 | Eisenhaure et al. |
| 5,969,457 A | 10/1999 | Clifton et al. |
| 5,994,794 A | 11/1999 | Wehrlen |
| 5,998,899 A | 12/1999 | Rosen et al. |
| 6,019,319 A | 2/2000 | Falbel |
| 6,023,152 A | 2/2000 | Briest et al. |
| 6,087,744 A * | 7/2000 | Glauning ................ H02K 1/32 310/58 |
| 6,134,124 A | 10/2000 | Jungreis et al. |
| 6,144,128 A | 11/2000 | Rosen |
| 6,166,472 A | 12/2000 | Pinkerton et al. |
| 6,169,390 B1 | 1/2001 | Jungreis |
| 6,175,166 B1 | 1/2001 | Bapat |
| 6,191,511 B1 * | 2/2001 | Zysset ..................... H02K 9/19 310/53 |
| 6,215,202 B1 | 4/2001 | Luongo et al. |
| 6,227,817 B1 | 5/2001 | Paden |
| 6,231,011 B1 | 5/2001 | Chu et al. |
| 6,262,505 B1 * | 7/2001 | Hockney ............ F16C 32/0442 310/51 |
| 6,268,674 B1 | 7/2001 | Takahashi |
| 6,304,015 B1 | 10/2001 | Filatov et al. |
| 6,347,925 B1 | 2/2002 | Woodard et al. |
| 6,388,347 B1 | 5/2002 | Blake |
| 6,441,581 B1 | 8/2002 | King et al. |
| 6,448,679 B1 | 9/2002 | Imlach |
| 6,464,472 B1 | 10/2002 | Sekiguchi et al. |
| 6,522,031 B2 | 2/2003 | Provanzana et al. |
| 6,566,775 B1 | 5/2003 | Fradella |
| 6,570,286 B1 | 5/2003 | Gabrys |
| 6,583,528 B2 | 6/2003 | Gabrys |
| 6,585,490 B1 | 7/2003 | Gabrys et al. |
| 6,614,132 B2 | 9/2003 | Hockney et al. |
| 6,624,532 B1 | 9/2003 | Davidow et al. |
| 6,624,542 B1 * | 9/2003 | Gabrys ................ F16C 32/044 310/52 |
| 6,630,761 B1 | 10/2003 | Gabrys |
| 6,664,680 B1 | 12/2003 | Gabrys |
| 6,675,872 B2 | 1/2004 | Lewis et al. |
| 6,700,258 B2 | 3/2004 | McMullen et al. |
| 6,703,735 B1 | 3/2004 | Gabrys |
| 6,707,187 B1 | 3/2004 | Gabrys |
| 6,710,489 B1 * | 3/2004 | Gabrys .................. H02K 7/025 310/74 |
| 6,727,616 B1 | 4/2004 | Gabrys |
| 6,727,617 B2 | 4/2004 | McMullen et al. |
| 6,737,762 B2 | 5/2004 | Koenig |
| 6,741,007 B2 | 5/2004 | Frash et al. |
| 6,747,378 B2 | 6/2004 | Brackett |
| 6,794,776 B1 * | 9/2004 | Gabrys .................. H02K 7/025 310/209 |
| 6,806,605 B1 | 10/2004 | Gabrys |
| 6,817,266 B1 | 11/2004 | Brackett |
| 6,824,861 B2 | 11/2004 | Spears |
| 6,825,588 B2 | 11/2004 | Gabrys et al. |
| 6,852,401 B2 | 2/2005 | Spears et al. |
| 6,863,493 B2 * | 3/2005 | Stones |
| 6,882,072 B2 | 4/2005 | Wingett et al. |
| 6,882,904 B1 | 4/2005 | Petrie et al. |
| 6,884,039 B2 | 4/2005 | Woodard et al. |
| 6,897,587 B1 | 5/2005 | McMullen et al. |
| 6,914,349 B2 | 7/2005 | Rajagopalan |
| 6,959,756 B2 | 11/2005 | Woodard et al. |
| 6,980,891 B2 | 12/2005 | Nagafuchi et al. |
| 6,995,529 B2 | 2/2006 | Sibley |
| 7,034,420 B2 | 4/2006 | Brackett et al. |
| 7,052,253 B2 | 5/2006 | Izraelev |
| 7,053,589 B2 | 5/2006 | Gabrys et al. |
| 7,071,581 B2 | 7/2006 | Eisenhaure et al. |
| 7,156,195 B2 * | 1/2007 | Yamagishi .......... F16H 57/0476 180/65.1 |
| 7,174,806 B2 | 2/2007 | Brackett et al. |
| 7,197,958 B2 | 4/2007 | Brault et al. |
| 7,267,028 B2 | 9/2007 | Gabrys |

(56) References Cited

U.S. PATENT DOCUMENTS

| | | | |
|---|---|---|---|
| 7,343,361 B2 | 3/2008 | Peljto et al. | |
| 7,358,620 B2 | 4/2008 | Melfi | |
| 7,365,461 B2 | 4/2008 | Brackett et al. | |
| 7,413,423 B2* | 8/2008 | Bonifas | F04C 23/008 418/55.6 |
| 7,416,039 B1 | 8/2008 | Anderson et al. | |
| 7,566,990 B2 | 7/2009 | Loucks et al. | |
| 7,679,245 B2 | 3/2010 | Brackett et al. | |
| 7,679,247 B2 | 3/2010 | Wang | |
| 7,715,951 B2 | 5/2010 | Forbes, Jr. et al. | |
| 7,786,616 B2 | 8/2010 | Naden et al. | |
| 7,830,055 B2 | 11/2010 | Arseneaux et al. | |
| 7,834,479 B2 | 11/2010 | Capp et al. | |
| 7,847,423 B1 | 12/2010 | Farkas | |
| 7,881,058 B2* | 2/2011 | Romer | B30B 11/08 310/54 |
| 8,008,804 B2 | 8/2011 | Capp et al. | |
| 8,030,787 B2 | 10/2011 | Kalev | |
| 8,102,144 B2 | 1/2012 | Capp et al. | |
| 8,314,527 B2 | 11/2012 | Wang | |
| 8,343,603 B2 | 1/2013 | Negle | |
| 8,669,675 B2 | 3/2014 | Capp et al. | |
| 8,970,075 B2* | 3/2015 | Rippel | H02K 1/20 310/54 |
| 9,065,313 B2* | 6/2015 | Chang | H02K 9/20 |
| 9,148,037 B2* | 9/2015 | Kalev | H02K 7/025 |
| 9,856,941 B2* | 1/2018 | Arseneaux | F16F 15/302 |
| 2002/0041126 A1 | 4/2002 | Provanzana et al. | |
| 2003/0010037 A1 | 1/2003 | Vugdelija | |
| 2003/0155831 A1 | 8/2003 | Gabrys et al. | |
| 2003/0160595 A1 | 8/2003 | Provanzana et al. | |
| 2003/0225483 A1 | 12/2003 | Santinato et al. | |
| 2004/0080218 A1* | 4/2004 | Weidman | |
| 2004/0126635 A1 | 7/2004 | Pearson | |
| 2004/0135436 A1 | 7/2004 | Gilbreth | |
| 2004/0145246 A1* | 7/2004 | Nakano | H02K 1/18 310/11 |
| 2004/0150374 A1 | 8/2004 | Kraus | |
| 2004/0256929 A1 | 12/2004 | Gabrys et al. | |
| 2005/0035744 A1 | 2/2005 | Potter et al. | |
| 2005/0150323 A1 | 7/2005 | Spears | |
| 2007/0014980 A1 | 1/2007 | Spears | |
| 2007/0103009 A1 | 5/2007 | Yang | |
| 2008/0024020 A1* | 1/2008 | Iund | H02K 5/20 310/61 |
| 2008/0315696 A1 | 12/2008 | Wang | |
| 2009/0317233 A1 | 12/2009 | Carter et al. | |
| 2010/0237629 A1 | 9/2010 | Gray | |
| 2010/0264759 A1* | 10/2010 | Shafer | H02K 1/20 310/54 |
| 2011/0175371 A1 | 7/2011 | Gray | |
| 2011/0278853 A1 | 11/2011 | Capp et al. | |
| 2011/0298293 A1 | 12/2011 | Veltri | |
| 2012/0007704 A1 | 1/2012 | Nerl | |
| 2012/0056483 A1 | 3/2012 | Capp et al. | |
| 2012/0065805 A1 | 3/2012 | Montalvo | |
| 2013/0002064 A1* | 1/2013 | De Bock | H02K 1/32 310/54 |
| 2013/0009476 A1 | 1/2013 | Solis et al. | |
| 2013/0009477 A1 | 1/2013 | DeLattre et al. | |
| 2013/0015825 A1 | 1/2013 | Pullen | |
| 2013/0043750 A1 | 2/2013 | Wang | |
| 2013/0270914 A1 | 10/2013 | Veltri | |
| 2015/0372568 A1* | 12/2015 | Korner | H02K 1/32 310/54 |

FOREIGN PATENT DOCUMENTS

| | | |
|---|---|---|
| BR | PI 0413598-9 A | 10/2006 |
| CA | 2 417 405 | 7/2004 |
| CA | 2 535 458 A1 | 3/2005 |
| CA | 2 801 307 A1 | 12/2011 |
| CA | 2 813 020 A1 | 10/2013 |
| CN | 1759518 A | 4/2006 |
| CN | 101251149 A | 8/2008 |
| CN | 103038541 A | 4/2013 |
| EP | 0 235 555 B1 | 5/1992 |
| EP | 0 291 742 B1 | 2/1993 |
| EP | 0 872 942 A2 | 10/1998 |
| EP | 1 271 741 A2 | 1/2003 |
| EP | 1381142 A2 | 1/2004 |
| EP | 1 394 928 A3 | 9/2004 |
| EP | 1 171 946 B1 | 8/2006 |
| EP | 1 275 822 B1 | 5/2009 |
| EP | 2293406 A1 | 3/2011 |
| EP | 2 330 726 A2 | 6/2011 |
| JP | S51-103148 U | 8/1976 |
| JP | S56-66541 A | 6/1981 |
| JP | S56-141442 A | 11/1981 |
| JP | S63-101514 A | 5/1988 |
| JP | 6-284583 A | 10/1994 |
| JP | H10-220341 A | 8/1998 |
| JP | H11-150911 A | 6/1999 |
| JP | 2000-14013 A | 1/2000 |
| JP | 2007-503191 A | 2/2007 |
| JP | 2013-531452 A | 8/2013 |
| KR | 10-2013-0121703 A | 11/2013 |
| MX | 2012014398 A | 6/2013 |
| WO | WO 98/43341 A1 | 10/1998 |
| WO | WO 99/13553 A1 | 3/1999 |
| WO | WO 99/50945 A1 | 10/1999 |
| WO | WO 01/17092 A1 | 3/2001 |
| WO | WO 02/03523 A2 | 1/2002 |
| WO | WO 02/097945 A2 | 12/2002 |
| WO | WO 02/103879 A1 | 12/2002 |
| WO | WO 03/023224 A1 | 3/2003 |
| WO | 2004/068677 A1 | 8/2004 |
| WO | WO 2005/029667 A2 | 3/2005 |
| WO | WO 2011/090511 A2 | 7/2011 |
| WO | WO 2011/153612 A2 | 12/2011 |
| WO | WO 2013/096946 A1 | 6/2013 |
| WO | WO 2013/155598 A1 | 10/2013 |

OTHER PUBLICATIONS

International Preliminary Report on Patentability and Written Opinion of the International Searching Authority for Int'l Appl. No. PCT/CA2013/050840, dated May 5, 2015, 5 pages.

Aditya, S.K. et al., "Battery energy storage for load frequency control of an interconnected power system," Electric Power Systems Research 58, pp. 179-185, Feb. 2001.

Akagi, H., "Active filters and energy storage systems operated under non-periodic conditions," Power Engineering Society Summer Meeting, 2000, IEEE, vol. 2, 16-20, pp. 965-970, Jul. 2000.

Akhil, A. et al., "Cost Analysis of Energy Storage Systems for Electric Utility Applications," Sandia National Laboratories, 62 pages, Feb. 1997.

Athay, T.M. "Generation Scheduling and Control," Proceedings of the IEEE, vol. 75, No. 12, pp. 1592-1606, Dec. 1987.

Bender, D. A. et al., "DC Power Management with a High Performance Flywheel," AFS Trinity Power Corporation, EESAT 2002 Conference, 4 pages, Apr. 2002.

Bender, D. A. et al., "DC Power Mangement with a High Performance Flywheel," presentation, AFS Trinity Power Corporation, EESAT 2002 Conference, 12 pages, Apr. 2002.

Bhatnager, D. et al., "Market and Policy Barriers to Energy Storage Deployment," Sandia National Laboratories, 58 pages, Sep. 2013.

Bornemann, H.J. et al., "Conceptual system design of a 5 MWh/100 MW superconducting flywheel energy starge plant for power utility applications," IEEE Transactions on Applied Superconductivity, vol. 7, Issue 2, Part 1, pp. 398-401, Jun. 1997.

Bose, A. et al., "Impact of New Energy Technologies on Generation Scheduling," IEEE Transactions on Power Apparatus and Systems, vol. PAS-103, No. 1, pp. 66-71, Jan. 1984.

Butler, P., et al., "Energy Storage Opportunities Analysis Phase II Final Report A Study for the DOE Energy Storage Systems Program," Sandia National Laboratories, 60 pages, May 2002.

Butler, P.C., "Battery Energy Storage for Utility Applications: Phase I—Opportunities Analysis," Sandia National Laboratories, 69 pages, Oct. 1994.

(56) References Cited

OTHER PUBLICATIONS

Canadian Office Action for Application No. CA 2,535,458, dated Jan. 27, 2014.
"Chino Battery Energy Storage Power Plant: First Year of Operation," Bechtel Group, Inc., 236 pages, Dec. 1992.
Cook, G.M. et al., "Overview of Battery Power Regulation and Storage," IEEE Transactions on Energy Conversion, vol. 6, No. 1, pp. 204-211, Mar. 1991.
Day, A.C. et al., "Flywheels With All-Passive, Non-Contact Magnetic Suspensions," presentation, Boeing Phantom Works, EESAT 2002 Conference, 18 pages, Apr. 2002.
Day, A.C. et al., "Flywheels With All-Passive, Non-Contact Magnetic Suspensions," Boeing, EESAT 2002 Conference, 6 pages, Apr. 2002.
European Search Report Issued in European Application No. 04809577.2, 3 pages, dated Feb. 22, 2012.
Gordon, S.P. et al., eds., "The Emerging Roles of Energy Storage in a Competitive Power Market: Summary of a DOE Workshop," Sandia National Laboratories, 78 pages, Jun. 1995.
Hampton, D. E. et al., "Emergency control of power system frequency using flywheel energy injection," Advances in Power System Control, Operation and Management, APSCOM-91, pp. 662-666, Nov. 1991.
Hearn, C.S. et al., "Low cost Flywheel Energy Storage for a Fuel cell Powered Transit Bus," Vehicle Power and Propulsion Conference, 8 pages, Sep. 9-12, 2007.
Hebner, R. et al., "Flywheel Batteries Come Around Again," IEEE Spectrum, pp. 46-51, Apr. 2002.
Higgins, M.A. et al., "Flywheel Energy Storage for Electric Utility Load Leveling," Proc. of the 26th Intersociety Energy Conversion Engineering Conference, vol. 4, pp. 209-214, Aug. 1991.
Hockney, R. et al., "Powering of Remote Node Locations Using Flywheel Energy Storage," IEEE, 18th International Telecommunications Energy Conference, pp. 662-667, Oct. 1996.
Hockney, R. et al., "Powering of Standby Power Supplies Using Flywheel Energy Storage," IEEE, pp. 105-109, 1997.
International Search Report and Written Opinion of the International Searching Authority for International Application No. PCT/CA2013/000359, 9 pages, dated Aug. 29, 2013.
International Search Report and Written Opinion of the International Searching Authority for International Application No. PCT/CA2013/050840, 8 pages, dated Jan. 30, 2014.
International Search Report for Application No. PCT/US04/26721, 2 pages, dated Nov. 1, 2005.
International Search Report from PCT Application No. PCT/CA2011/000641, 2 pages, dated Oct. 4, 2011.
Jiancheng, Z., et al., "Research on Flywheel Energy Storage System for Power Quality," IEEE, pp. 496-499, 2002.
Kirby, B.J., "Frequency Regulation Basics and Trends," Oak Ridge National Laboratory, U.S. Department of Energy, 32 pages, Dec. 2004.
Kottick, D. et al., "Battery Energy Storage for Frequency Regulation in an Island Power System," IEEE Transactions on Energy Conversion, vol. 8, No. 3, pp. 455-459, Sep. 1993.
Kunisch, H.J. et al., "Battery Energy Storage: Another Option for Load-Frequency-Control and Instantaneous Reserve," IEEE Transactions on Energy Conversion, vol. EC-1, No. 3, pp. 41-46, Sep. 1986.
Lazarewicz, M., "A Description of the Beacon Power High Energy and High Power Composite Flywheel Energy Storage System," presentation, EESAT 2002 Conference, 23 pages, Apr. 2002.
Lazarewicz, M., "A Description of the Beacon Power High Energy and High Power Composite Flywheel Energy Storage Systems," EESAT 2002 Conference, 6 pages, Apr. 2002.
Lazarewicz, M.L. et al., "Grid Frequency Regulation by Recycling Energy in Flywheels," Beacon Power, 5 pages, 2004.
Lazarewicz, M.L. et al., "Status of Pilot Projects Using Flywheels for Frequency Regulation," IEEE, 3 pages, 2006.
Lu, C.F. et al., "Effect of Battery Energy Storage System on Load Frequency Control Considering Governor Deadband and Generation Rate Constraint," IEEE Transactions on Energy Conversion, vol. 10, No. 3, pp. 555-561, Sep. 1995.
Lyons, P., "Energy Storage for Power Systems with Rapidly Changing Loads," pp. 1-112, Purdue University, available at http://docs.lib.purdue.edu/cgi!viewcontent.cgi?article=1266&context=ecetr, Dec. 2002.
Mack, D.R., "Something new in power technology," IEEE Potentials, pp. 40-42, Apr. 1993.
Makansi, J. et al., "Energy Storage: The Missing Link in the Electricity Value Chain," Energy Storage Council, 23 pages, May 2002.
McElligott, S., "Flywheels Set to Help Regulate Frequency on the U.S. Grid," TechSurveillance Magazine, Cooperative Research Network, 7 pages, Nov. 2010.
Mrugowsky, H. et al., "Investigation of the stability of a 600 MJ energy storage system based on paralleled flywheel generators," presentation, EESAT 2002 Conference, 25 pages, Apr. 2002.
Park, J.D., "Simple Flywheel Energy Storage using Squirrel-Cage Induction Machine for DC Bus Microgrid Systems," IECON 2010—36th Annual Conference on IEEE Industrial Electronics Society, pp. 3040-3045, Nov. 2010.
Rabenhorst, D.W. et al., "Low-Cost Flywheel Demonstration Program," The Johns Hopkins University, Applied Physics Laboratory, 108 pages, Apr. 1980.
Ribeiro, P.F. et al., "Energy Storage Systems for Advanced Power Applications," Proceedings of the IEEE, vol. 89, No. 12, pp. 1744-1756, Dec. 2001.
Richey, S., "Cleansource2 Battery-Free Energy Storage Theory of Operation," Active Power, EESAT 2002 Conference, 5 pages, 2002.
Richey, S., "Cleansource2 Battery-Free Energy Storage Theory of Operation," presentation, Active Power, EESAT 2002 Conference, 22 pages, 2002.
Rojas, A., "Flywheel Energy Matrix Systems—Today's Technology, Tomorrow's Energy Storage Solution," Beacon Power Corp, 10 pages, 2003.
Sasaki, T. et al., "Study on Load Frequency Control Using Redox Flow Batteries," IEEE Transactions on Power Systems, vol. 19, No. 1, pp. 660-667, Feb. 2004.
Sears, J.R., "TEX: The Next Generation of Energy Storage Technology," IEEE, 11-3, pp. 218-222, 2004.
Sen, U., "Battery Energy Storage for Load Frequency Control of an Interconnected Power System," Delhi Technological University, 73 pages, Jun. 2011.
Symons, P.C., "Opportunities for Energy Storage in Stressed Electricity Supply Systems," IEEE, pp. 448-449, 2001.
Tarrant, C., "Revolutional flywheel energy storage system for quality power," Power Engineering Journal, pp. 159-163, Jun. 1999.
Townley, D., "Introducing Pentadyne Power Flywheel Energy Storage System," Pentadyne Power Corporation, EESAT 2002 Conference, 4 pages, Apr. 2002.
Townley, D., "Performance and Application of the Pentadyne Flywheel System," presentation, Pentadyne Power Corporation, EESAT 2002 Conference, 24 pages, Apr. 2002.
Van Der Linden, S., "The Commercial World of Energy Storage: A Review of Operating Facilities," presentation, 1st Annual Conference of the Energy Storage Concil, 51 pages, Mar. 2003.
Wagner, R. et al., "Flywheel Technology Development At The NASA Glenn Research Center," University of Toledo, NASA Glenn Research Center, EESAT 2002 Conference, 6 pages, Apr. 2002.
Wagner, R. et al., "Flywheel Technology Development At The NASA Glenn Research Center," presentation, University of Toledo, NASA Glenn Research Center, EESAT 2002 Conference, 17 pages, Apr. 2002.
Zarzour, M. et al., "Experimental Evaluation of a Metal Mesh Bearing Damper," Transactions of the ASME, vol. 122, pp. 326-329, Apr. 2000.
English Language Abstract of Japanese Patent Publication No. 06-284583 A, Japanese Patent Office, Patent Abstracts of Japan, Oct. 1994.
English Language Abstract of Japanese Patent Publication No. 2000-014013 A, Japanese Patent Office, Patent Abstracts of Japan, Jan. 2000.

(56) References Cited

OTHER PUBLICATIONS

Supplemental European Search Report in European Application No. PCT/CA2013050840, 7 pgs., dated Jul. 12, 2016.
Neodymium magnet—en.wikipedia.org, Jan. 10, 2015, 9 pages.
Magnet—en.wikipedia.org, Jan. 10, 2015, 19 pages.
The Electrodyne Company, Reance F Flexible Neodymium Rare Earth Magnets, edyne.com, Jan. 12, 2015, 2 pages.
Brushless DC electric motor, wikipedia.org, Jan. 10, 2015, 8 pages.
Friction—Wikipedia, the free encyclopedia, Jul. 26, 2015, 17 pages.
Office Action dated May 15, 2014 in related MX Patent Application No. Mx/a/2012/014398, 3 pages.
Notice of Allowance dated Nov. 3, 2014 for MX Patent Application No. MX/a/2012/014398, 6 pages (with English translation of the claim set).
First Office Action and Search Report dated Apr. 1, 2014 for related CN Patent Application No. 201180035118.2 with English translation, 25 pages.
Non-final Office Action and Notice of References Cited dated Jul. 23, 2018 in related U.S. Appl. No. 15/137,355, 19 pages.
Define permanent magnet—Google Search, Jul. 16, 2018, 20 pages.
Define array—Google Search, Jul. 16, 2018, 22 pages.
Non-final Office Action and Notice of References Cited dated Jan. 20, 2015 in related U.S. Appl. No. 13/153,216, 21 pages.
Notice of Allowance and Notice of References Cited dated May 23, 2014 in related U.S. Appl. No. 13/863,727, 6 pages.
Supplementary/Extended European Search Report in related European Application No. 13778086.2, dated Jun. 9 2015, 8 pages.
Partial Supplementary European Search Report dated Mar. 14, 2018 in related EP Patent Application No. 11791768.2.
Notice of Reasons for Refusal and Search Report dated Mar. 11, 2015 in related JP Patent Application No. 2013-513502, 6 pages.
Makansi et al., "Energy Storage—The Missing Link in the Electricity Value Chain, An ESC White Paper"; May 2002; Section A.3, pp. 46 to 49; Energy Storage Council.
Patent Examination Report No. 1 dated Aug. 27, 2015 in related AU Patent Application No. 2011264367, 6 pages.
Second Office Action dated Nov. 4, 2014 for CN Patent Application No. 201180035118.2 with English translation, 8 pages.
Third Office Action and Search Report dated May 4, 2015 for CN Patent Application No. 201180035118.2 with English translation, 23 pages.

* cited by examiner

COOLED FLYWHEEL APPARATUS HAVING A STATIONARY COOLING MEMBER TO COOL A FLYWHEEL ANNULAR DRIVE SHAFT

CROSS-REFERENCE TO RELATED APPLICATION

The present application claims priority to U.S. Provisional Application No. 61/722,308, filed Nov. 5, 2012 and titled, "Cooled Flywheel Apparatus," the entire contents of which are incorporated herein by reference.

BACKGROUND

This invention relates to cooled flywheel apparatus.

Flywheels are used as energy storage devices. In a typical application, a flywheel is connected to a motor-generator and electrical power is input to the motor-generator to spin up the flywheel. Later, power can be extracted from the flywheel by connecting an electrical load to the motor-generator. To minimize windage losses, the flywheel rotor typically operates in a partial vacuum environment.

Flywheels have been used in applications such as power smoothing for wind turbines. Because of their continuous operation, heat build-up in the flywheel rotor is a problem that risks early failure of a flywheel apparatus.

SUMMARY

A flywheel is provided with an annular drive shaft and a stationary cooling member for directing a coolant into the drive shaft annulus. Coolant pumped through the cooling member will contact the wall of the annulus to cool the drive shaft and components thermally coupled to the drive shaft. Where the flywheel has an upright axis of rotation with the annulus opening downwardly, coolant falls from the annulus to a sump positioned below the drive shaft. In one aspect, the cooling member can be a perforated wand disposed in the drive shaft annulus. In another aspect, the cooling member can be a nozzle disposed adjacent the drive shaft annulus.

Accordingly, in an embodiment, there is provided a cooled flywheel apparatus having a flywheel with an annular drive shaft; a stationary perforated wand disposed in the annulus of said annular drive shaft; and a cooling fluid line in fluid communication with a base of said wand.

In an alternate embodiment, there is provided a cooled flywheel apparatus having a flywheel with an annular drive shaft; a stationary nozzle disposed adjacent the annulus of said annular drive shaft; and a cooling fluid line in fluid communication with a base of the nozzle.

Other features and advantages will become apparent from the following description in conjunction with the drawings.

DRAWINGS

In the figures which illustrate an example embodiment,

DESCRIPTION

Figure 1:
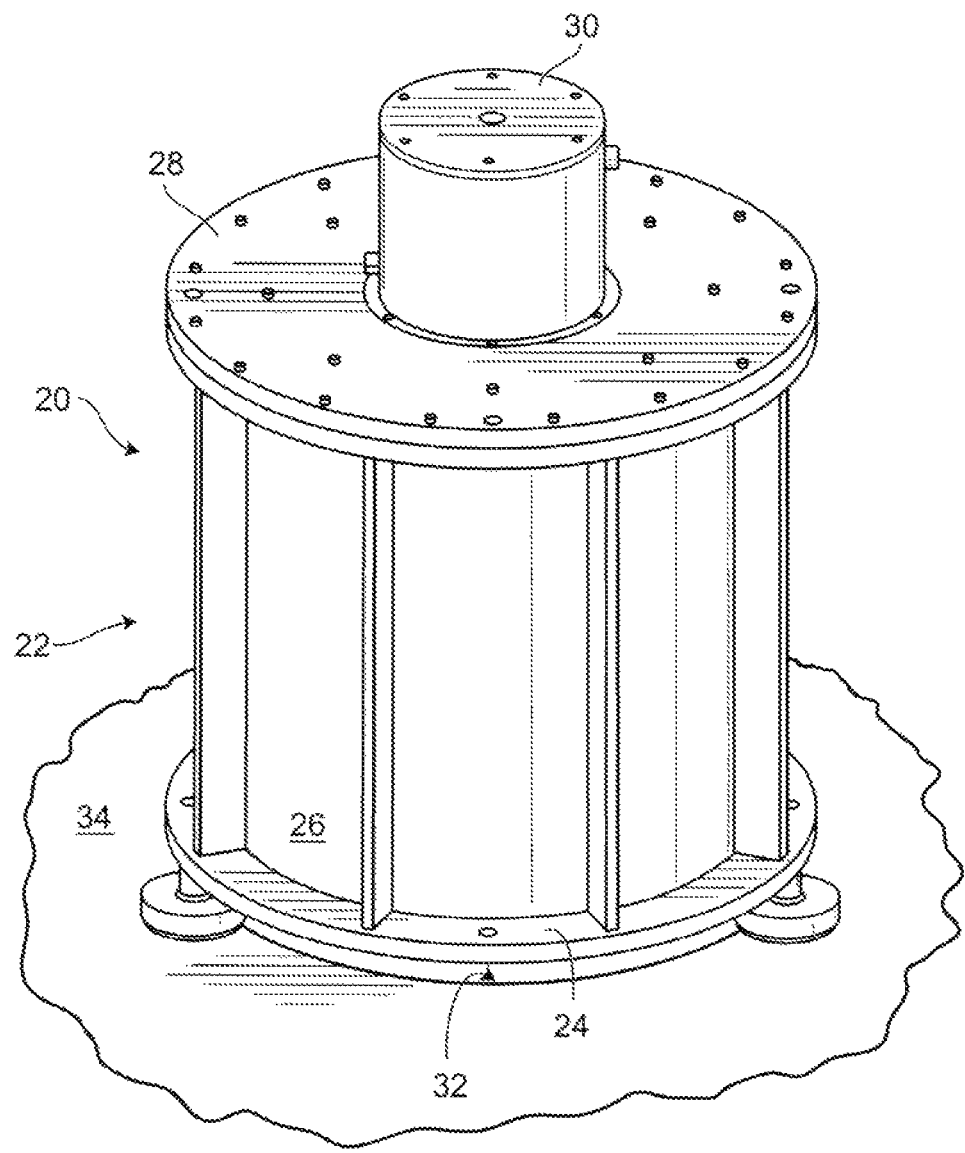
FIG. 1 is a perspective view of an energy storage system having a flywheel cooling apparatus, according to an embodiment of the present invention.

FIG. 1 is a perspective view of an energy storage system 20 that has a housing 22 containing a flywheel and a motor-generator (not shown in FIG. 1), according to an embodiment of the present invention. The motor-generator is coupled to the flywheel to either drive the flywheel or be driven by the flywheel. The housing 22 has a base 24, a cylindrical side wall 26 and an annular top plate 28 closed by an extension 30. The housing is positioned over a pit 32 in the floor 34 which accommodates certain portions of system 20, as will become apparent.

In an embodiment, the housing 22 is formed from non-ferromagnetic materials to avoid magnetic drag that would slow the flywheel. Suitable non-ferromagnetic materials may be selected from a group including, but not limited to, stainless steel, aluminum, plastics, fibreglass, concrete, and combinations thereof, which materials may also be reinforced with composite materials, including, but not limited to, carbon fibre, Kevlar™, or the like.

Figure 2:
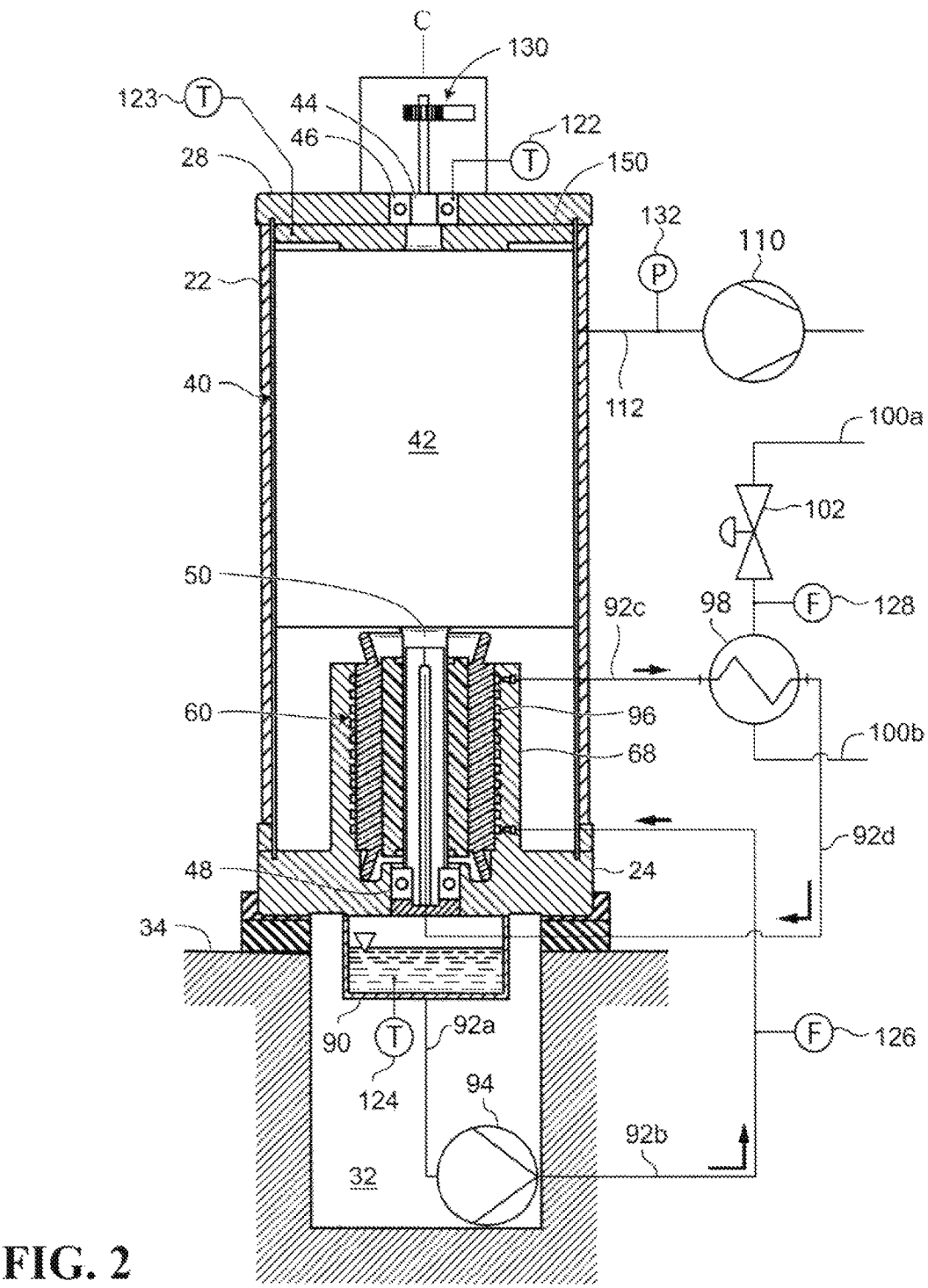
FIG. 2 is a schematic cross-sectional view of the energy storage system of FIG. 1.

As seen in FIG. 2, the housing 22 contains a flywheel 40 having a rotor 42, an upper support shaft 44, and a lower drive shaft 50, all with a common central axis C. In an embodiment, the rotor 42 and shafts 44 and 50 are integrally formed from a forged blank. The diameters of the shafts 44, 50 differ due to the different loads applied. The flywheel is vertically mounted for rotation about the central axis C by bearing assemblies 46, 48, and 150. Bearing assembly 46 is attached to top plate 28 and supports support shaft 44 both radially and axially to position the flywheel rotor 42. Bearing assembly 48 is attached to base 24 and supports drive shaft 50 radially, while allowing drive shaft 50 to slide axially. Bearing 150 is a magnetic bearing, with an annular permanent magnet that carries the majority of the axial load of the flywheel rotor 42 (thereby greatly extending the operating life of bearing assembly 46). Suitable magnetic bearing assemblies are further described in U.S. patent application publication no. US2011/0298293, the disclosure of which is incorporated herein by reference in its entirety.

The rotor 42 may be made from a ferromagnetic material, such as, for example, high density steel. In alternate embodiments, other ferromagnetic materials from which the rotor 42 may be manufactured are iron, nickel, cobalt, and the like. The higher the mass of the rotor 42, the greater the kinetic energy the energy storage system 20 is able to store at the same rotational speed of the flywheel. In contrast, the higher the mass of the rotor 42, the greater the frictional forces in the system.

Figure 3:
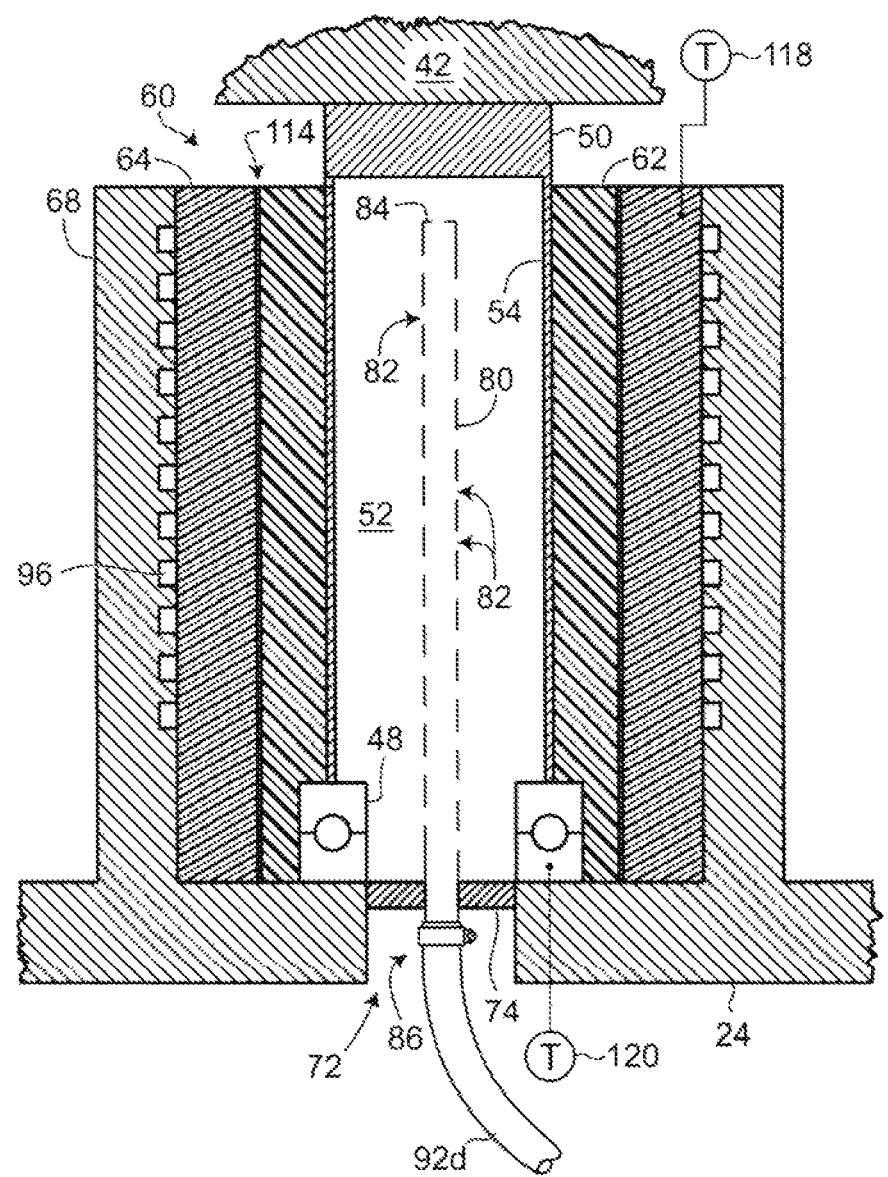
FIG. 3 is a cross-sectional schematic detail of a portion of FIG. 2.

Referencing FIG. 3 along with FIG. 2, the drive shaft 50 is annular, having a central annulus 52 with an annulus wall 54. The motor-generator 60 surrounds drive shaft 50, with the rotor 62 of the motor-generator being a sleeve that is fitted tightly to the drive shaft and the stator 64 disposed radially outwardly of the rotor 62. The base 24 has an projecting sleeve 68 which abuts the periphery of the stator 64 of the motor-generator 60.

The base 24 has a central annulus 72 with a web 74 (that may be shaped like a wagon wheel) supporting a cooling member. In one aspect of the invention, the cooling member can be an elongated annular wand 80 so that the wand projects upwardly into the annulus 52 of the drive shaft 50 and fluid may pass through the wand. The wand has a series of perforations 82 about its periphery along its length as well as one or more perforations at its tip 84. The wand is open at its base 86. In another aspect of the invention, the cooling member can be cooling nozzle 1080, discussed below with respect to FIGS. 5-8.

A sump 90 in the form of an open-topped vessel is attached to the underside of the base 24 and extends into pit 32. An opening of the sump 90 is sealed from the ambient environment by the rousing 22. A coolant line 92a runs from the outlet of the sump to the inlet of a coolant pump 94. The coolant pump is located at the bottom of pit 32. A coolant line 92b runs from the outlet of the pump to a lower end of a heat exchange coil 96 that coils along the stator 64. A coolant line 92c runs from the upper end of the coil to a heat exchanger 98. A coolant line 92d runs from the outlet of the heat exchanger 98 to the base 86 of the wand 80. A heat exchange fluid line 100a runs through a flow control valve 102 to the heat exchanger 98 and a fluid line 100b is connected to a heat exchange fluid outlet of the heat exchanger 98.

A vacuum pump 110 connects via vacuum line 112 to the interior of the housing 22. A radial air gap 114 between the rotor 62 and the stator 64 communicates a vacuum in the housing around bearing assembly 48 to the annulus 52 of the drive shaft. The interface between the sump vessel and base 24 is sealed so that a vacuum communicated to the sump is maintained. The flywheel rotor is operated in a partial vacuum to minimize air frictional losses and heating. However, the partial vacuum above the coolant surface in the sump 90 requires that the pump 94 be positioned sufficiently below the sump to provide a pressure head at the pump inlet that is high enough to avoid loss of flow and cavitation through the expected range of pump operating speeds.

Temperature sensor 118 senses temperature of the stator 64, temperature sensor 120 senses the temperature of the bearing 48, temperature sensor 122 senses the temperature of the bearing 46, temperature sensor 123 senses the temperature of magnetic bearing 150, and temperature sensor 124 senses the temperature of coolant in the sump 90. Flow sensor 126 senses the speed at which coolant is pumped by the coolant pump 94. Flow sensor 128 senses the speed at which heat exchange fluid flows through heat exchanger 98. Speed sensor 130 senses the rotational speed of the flywheel 40. Pressure sensor 132 senses the pressure in the interior of housing 22.

Figure 4:
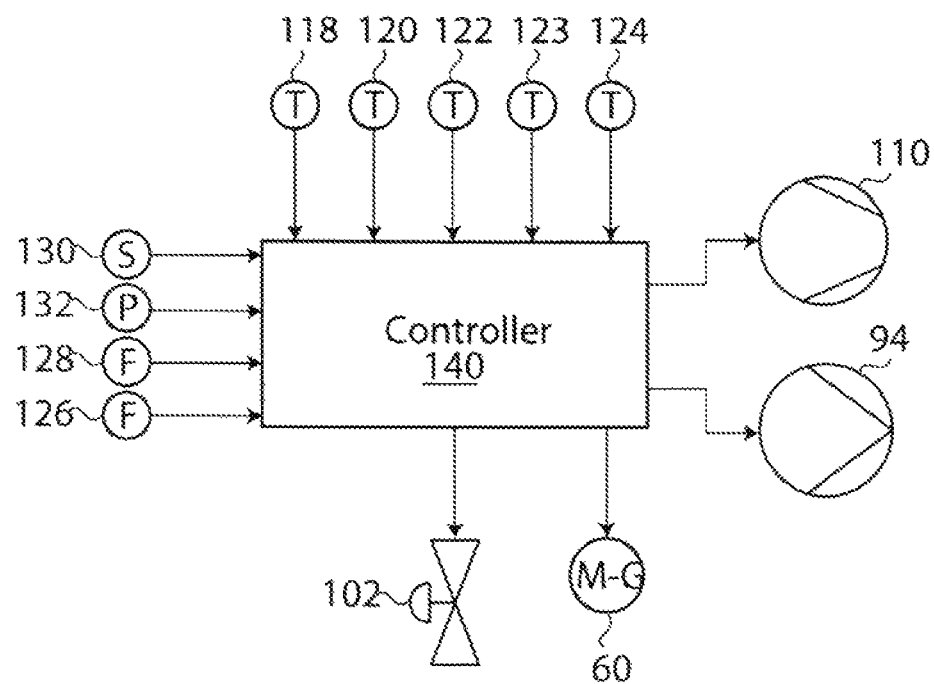
FIG. 4 is a schematic view of a system control apparatus.

Turning to FIG. 4, the various sensors input data into a controller 140. The controller outputs control signals to the coolant pump 94, vacuum pump 110, flow control value 102, and motor-generator 60.

The coolant in the sump 90 which is supplied to the wand 80 is a heat transfer fluid with a boiling temperature that is higher than the normal operating temperatures at the expected operating pressures (e.g., in a partial vacuum). An example heat transfer fluid in this regard is DURATHERM 600™ manufactured by Duratherm Extended Life Fluids, a division of Frontier Resource and Recovery Services Incorporated. DURATHERM 600™ is a petroleum-based, non-toxic, heat transfer fluid with a low vapour pressure and a high operating temperature.

In operation, the controller 140 may excite the motor-generator 60 to apply a torque to drive shaft 50 and spin up flywheel 40. Once the flywheel has been spun up to a target rotational speed—as determined by the controller based on a speed signal from speed sensor 130—the excitation current to the motor-generator may be shut off and only intermittently applied to maintain the flywheel at its target speed. With the flywheel rotating within an operational speed window, an electrical load may be selectively applied to the motor-generator so that the flywheel powers the load by rotating the motor-generator. The flywheel rotor operates in a partial vacuum to minimize air frictional losses and heating. However, a significant amount of heat will be generated in the motor-generator 6C due to its operation and further heat will be generated due to friction in the bearings 46, 48, and elsewhere in system 20.

Removal of heat from the stator 64 of the motor-generator 60 is relatively straightforward, as heat may be removed via convection to the coolant in cooling coils 96 and by conduction to sleeve 68. On the other hand, removal of heat from the motor rotor 62 is more challenging, as heat can only be removed from the rotor via forced convection in view of air gap 114 and the vacuum environment.

According to an embodiment, controller 140 sets an initial speed of pumps 94 and 110 and an initial flow rate of heat exchange fluid through heat exchanger 98 by setting the position of flow control valve 102. With coolant pump 94 operating, coolant is pumped from the sump 90 through heat exchange coil 96 and heat exchanger 98 to wand 80. The coolant flowing up the wand escapes through the perforations along the length of the wand, resulting in coolant spraying radially outwardly from the perforations and impinging on the wall 54 of the annulus 52 of the drive shaft 50. It will be apparent that, because the rotor 62 is rotating, it naturally spreads the coolant so that it coats the annular wall of the rotor. As further coolant impinges on the annulus wall, it tends to displace coolant already on the wall so that the displaced coolant descends toward the base of the annulus and falls back into the sump 90. The constantly refreshed coolant on the wall 54 of the annulus 52 draws heat from this wall and, consequently, from components in thermal contact with wall 54. The components directly abutting the annulus wall 54 of the drive shaft 50 are the motor-generator rotor 62 and the bearing assembly 48. Thus, these components are principal beneficiaries of the cooling of the annulus wall of the drive shaft 50. However, as will be apparent, the motor-generator stator 64, flywheel rotor 42, support shaft 44 and upper bearing assembly 46 are all thermally coupled to the motor-generator rotor 62, and so also benefit from the cooling of the annular wall of the rotor. Additionally, coolant flowing through the heat exchange coil 96 directly cools the stator 64 and indirectly cools components thermally coupled to the stator. The indirect cooling of the flywheel rotor through its thermal coupling to the rotor and stator of the motor-generator 60 is used to keep the flywheel below a temperature that would heat the magnetic bearing assembly to a point where the annular permanent magnet within the assembly would be damaged.

The heat exchanger 98 cools the coolant exiting the coil 96 before it reaches the wand 80, so that the coolant is at its coolest when sprayed by the wand into the annulus 52. The coolant is under pressure between the outlet of the coolant pump 94 and the wand 80, which raises the boiling point of the coolant and avoids risk of the coolant boiling, even at high temperatures. Thus, it is not important to ensure the coolant is at its coolest when within coil 96. On the other hand, the coolant is under vacuum within the annulus such that its boiling point is significantly lower. Consequently, in circumstances where the coolant temperature exceeds operating norms, there might be a risk of the coolant reaching its boiling point within the annulus. If the coolant boiled, it would outgas in the annulus and degrade the vacuum, causing higher frictional drag on the flywheel rotor surface thereby risking further temperature increase. By ensuring the coolant is at its coolest in the annulus, this risk is minimized.

The controller receives input from temperature sensors 118, 120, 122, 123, and 124. If the temperature at any of these sensors migrates above a pre-set upper limit, the controller may respond by one or more of increasing the speed of coolant pump 94, increasing the flow rate of heat exchange fluid through the heat exchanger 98 by re-setting the position of flow control valve 102, and increasing the speed of the vacuum pump 110. If the temperatures become too high, the controller could also refrain from exciting the motor-generator 60, even when the speed of the flywheel fell below its operational window.

Giving an example, the vacuum pump may draw a vacuum of $10^{-2}$ Torr within the housing 22 and the set point for the maximum temperature within the system may be 70° C., where the coolant chosen for the system 20 will not boil below, say, 80° C. at $10^{-2}$ Torr.

In an embodiment, the pump 94 is located as far below the sump as practicable to maximize the coolant head and therefore the inlet pressure to the pump. This allows a higher maximum pump speed before a vacuum is drawn at the pump inlet.

In an embodiment, the base 24 is a cast or wrought part. Coil 96 can be formed by a machined or etched spiral groove on the inner wall of sleeve 68 with a thin-walled inner sleeve press fit to the inner wall of sleeve 68.

While an example embodiment has been described with respect to FIGS. 1-4, many modifications are possible. For example, while a specific coolant has been described, any coolant which will not boil at the expected operating temperatures and pressures may be substituted.

With feedback control, additional or different sensors than those described may be used in the system, provided they supply sufficient feedback information to enable the controller to adequately control the system. It may, however, be possible to operate the system with less feedback control. For example, it could be that the controller controls only the speed of the coolant pump, such that the vacuum pump runs at a fixed speed and the operating position of the flow control valve is fixed. Indeed, it may be possible to operate the energy storage system entirely without feedback control, running the coolant pump and the vacuum pump at fixed speeds and fixing the operating position of the flow control valve. In such a case, the only sensor may be a flywheel speed sensor, which a simplified controller could respond to in order to keep the speed of the flywheel within an operational window.

Disposing the flywheel such that its central rotational axis C is upright, ideally vertical, has the advantage that gravity assists in returning coolant from the annulus to the sump. It may be possible, however, to operate the energy storage system with the central rotational axis of the flywheel being horizontal.

Although frictional losses would be higher, the system could be operated without a vacuum pump. Or, the rotor annulus could be isolated from the remainder of the housing, such that only the remainder of the housing was placed under vacuum. This option has the advantage that the sump need not be sealed to the bottom of the base.

Bearing assembly 150 need not be a permanent magnet bearing but may be any suitable bearing. The base has been described as a cast or wrought part, but of course this is not necessary and the base could be composed of different parts suitably affixed together. The coil could be replaced with a coil running along the outside of the base sleeve, which may allow for a thinner-walled sleeve than shown. While the coil is shown in a cooling circuit in series with the cooling member, optionally, separate cooling circuits could be provided for the coil and the cooling member. In this regard, since an independent stator cooling circuit would not be under vacuum, the coil could be supplied with heat exchange fluid directly from the heat exchange fluid line. It may be possible to operate some systems with an air cooled heat exchanger rather than a liquid cooled heat exchanger. The pit could be eliminated by instead elevating the housing. The rotor and shafts could be formed from different parts rather than formed integrally.

Figure 5:
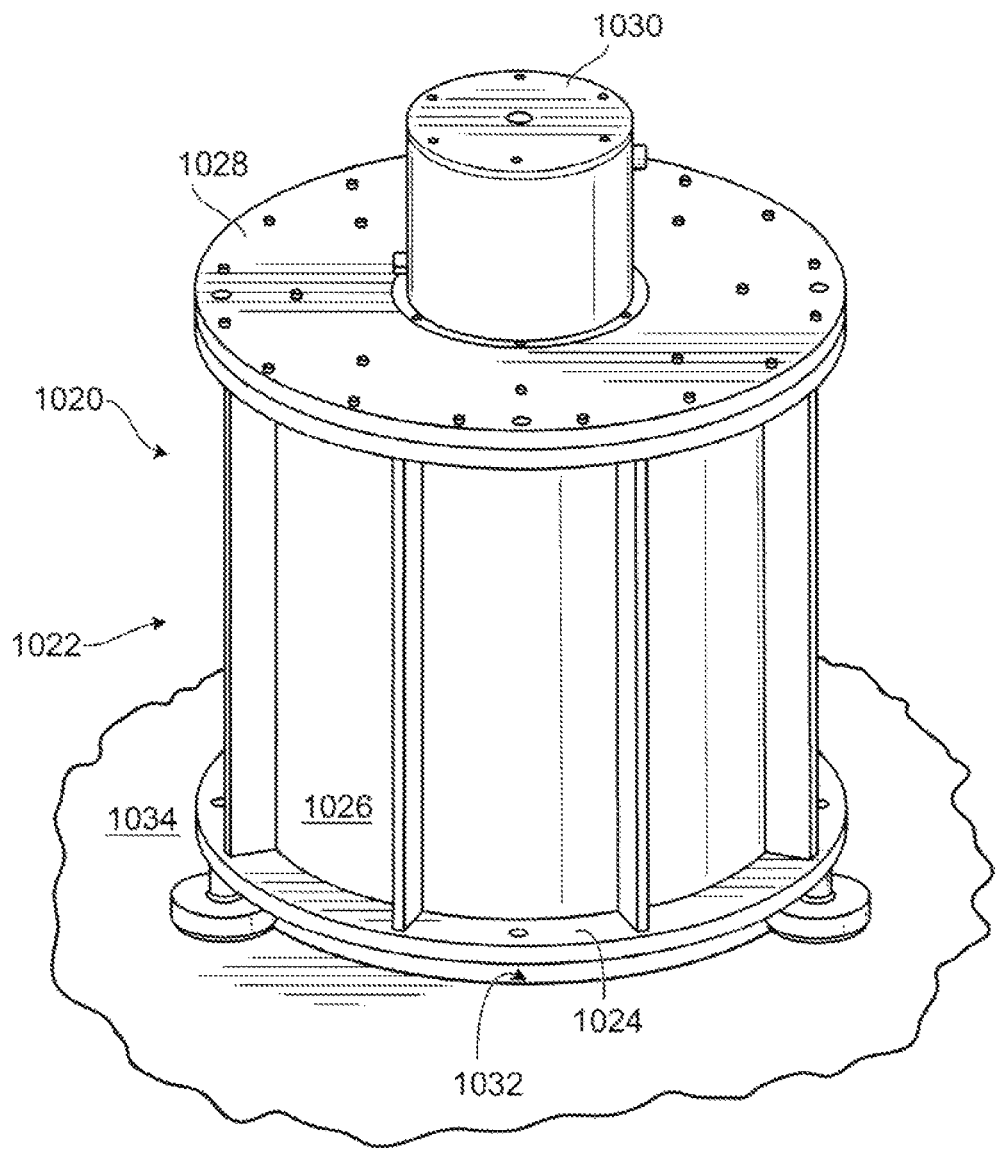
FIG. 5 is a perspective view of an energy storage system having a flywheel cooling apparatus according to another embodiment of the present invention.

FIG. 5 is a perspective view of an energy storage system 1020 according to another embodiment. Energy storage system 1020 has a housing 1022 containing a flywheel and a motor-generator (not shown in FIG. 5). The motor-generator is coupled to the flywheel to either drive the flywheel or be driven by the flywheel. The housing 1022 has a base 1024, a cylindrical side wall 1026 and an annular top plate 1028 closed by an extension 1030. The housing is positioned over a pit 1032 in the floor 1034 which accommodates certain portions of system 1020, as will become apparent.

In an embodiment, the housing 1022 can be formed from non-ferromagnetic materials to avoid magnetic drag that would hinder the rotation of the flywheel. Suitable non-ferromagnetic materials may be selected from a group including, but not limited to, stainless steel, aluminum, plastics, fibreglass, concrete, and combinations thereof, which materials may also be reinforced with composite materials, including, but not limited to, carbon fibre, Kevlar™, or the like.

Figure 6:
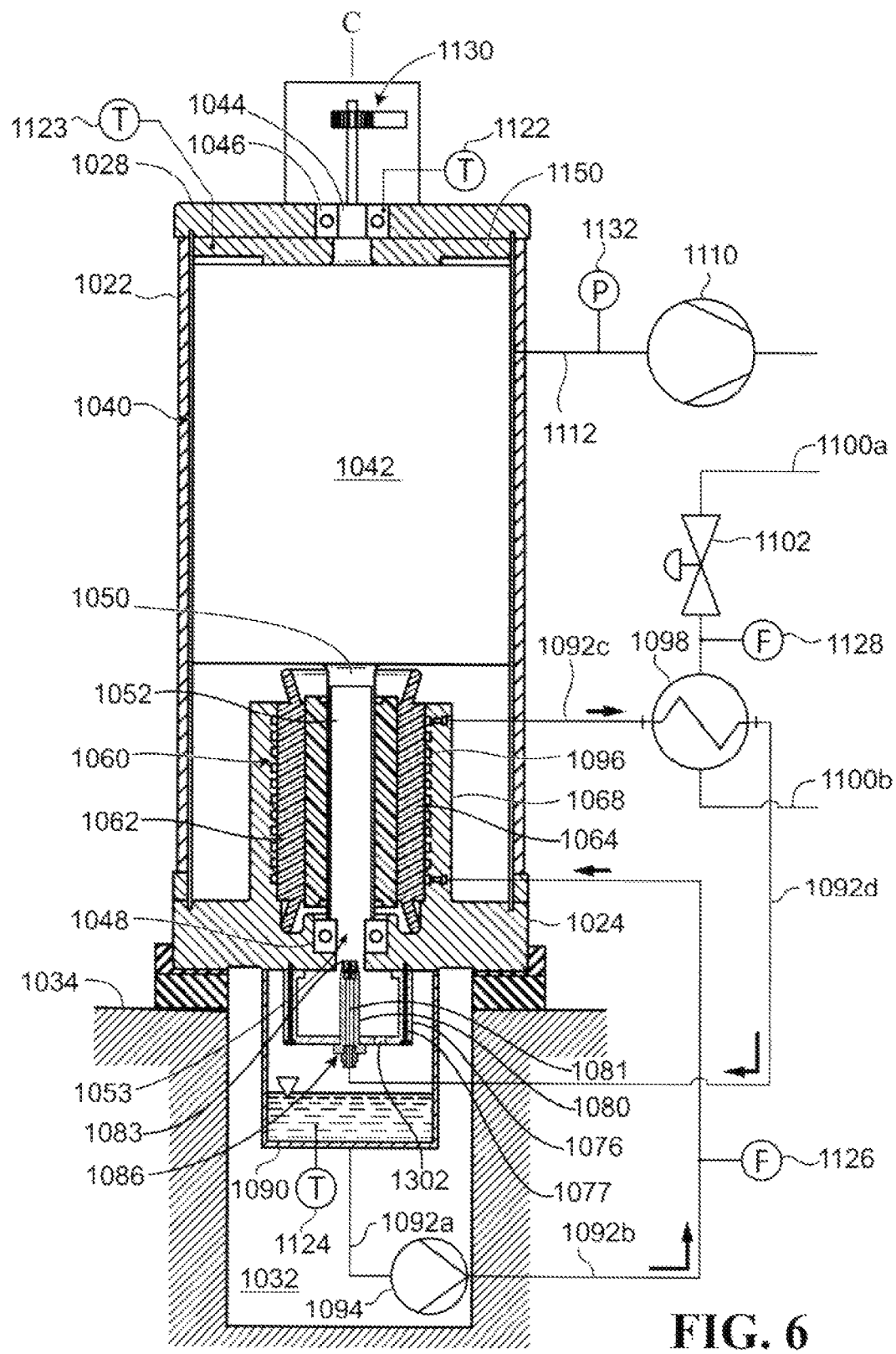
FIG. 6 is a schematic cross-sectional view of the energy storage system of FIG. 5.

As seen in FIG. 6, the housing 1022 contains a flywheel 1040 having a rotor 1042, an upper support shaft 1044, and a lower drive shaft 1050, all with a common central axis C. In an embodiment, the rotor 1042 and shafts 1044 and 1050 can be integrally formed from a forged blank. The diameters of the shafts 1044, 1050 differ due to the different loads applied. The flywheel can be vertically mounted for rotation about the central axis C by bearing assemblies 1046, 1048, and 1150. Bearing assembly 1046 can be attached to top plate 1028 and supports support shaft 1044 both radially and axially to position the flywheel rotor 1042. Bearing assembly 1048 can be attached to base 1024 and can support drive shaft 1050 radially, while allowing drive shaft 1050 to slide axially. Bearing 1150 can be a magnetic bearing, with an annular permanent magnet that carries the majority of the axial load of the flywheel rotor 1042 (thereby greatly extending the operating life of bearing assembly 1046). As discussed above, suitable magnetic bearing assemblies are further described in U.S. patent application publication no. US2011/0298293.

The rotor 1042 may be made from a ferromagnetic material, such as, for example, high density steel. In alternate embodiments, other ferromagnetic materials from which the rotor 1042 may be manufactured are iron, nickel, cobalt, and the like. The higher the mass of the rotor 1042, the greater the kinetic energy the energy storage system 1020 is able to store at the same rotational speed of the flywheel. In contrast, the higher the mass of the rotor 1042, the greater the frictional forces in the system.

Figure 7:
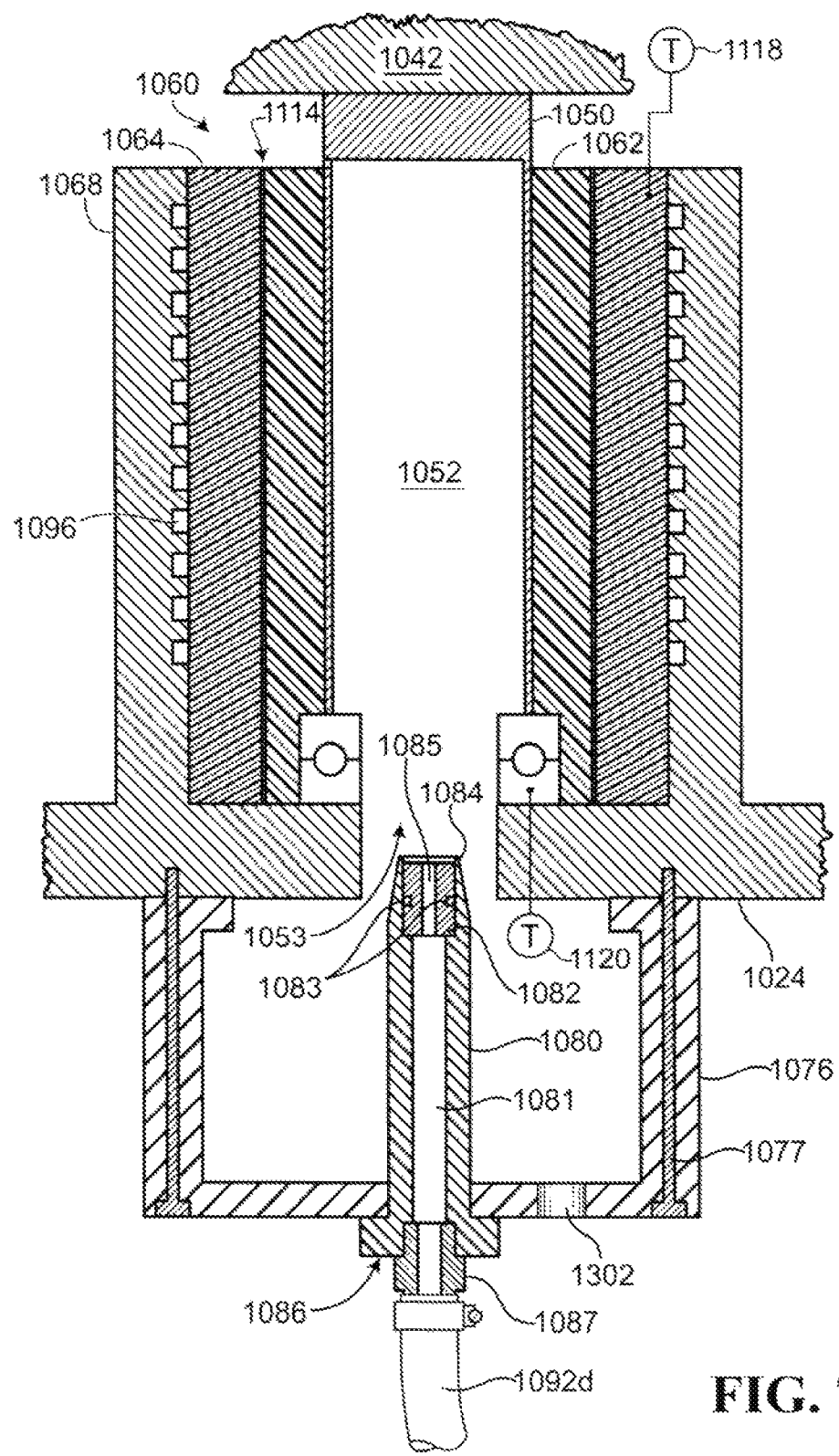
FIG. 7 is a cross-sectional schematic detail of a portion of FIG. 6.

Referencing FIG. 7 along with FIG. 6, the drive shaft 1050 can be annular, having a central annulus 1052 with an annulus wall 1054. The motor-generator 1060 surrounds drive shaft 1050, with the rotor 1062 of the motor-generator being a sleeve that is fitted tightly to the drive shaft and the stator 1064 disposed radially outwardly of the rotor 1062. The base 1024 has an projecting sleeve 1068 which abuts the periphery of the stator 1064 of the motor-generator 1060.

The base 1024 has a central annulus 1072. A cooling nozzle 1080 extends into central annulus 1072. In a further aspect of the invention, cooling nozzle 1080 can extend into central annulus 1052. Cooling nozzle 1080 includes a nozzle annulus 1081 that extends through the length of cooling nozzle 1080 from nozzle base 1086 to nozzle tip 1084. Cooling nozzle 1080 can include a removable piece 1087 that attaches to nozzle base 1086 at one end and to coolant line 1092d on a second end. Cooling nozzle 1080 can include a nozzle end piece 1082 that is secured within nozzle tip 1084. Nozzle end piece 1082 can be detachably attached to cooling nozzle 1080. In one aspect, nozzle end piece 1082 includes threading so that nozzle end piece 1082 can be attached to cooling nozzle 1080 by screwing nozzle end piece 1082 into nozzle tip 1084. In another aspect, nozzle end piece 1082 can be press-fit into nozzle tip 1084. Cooling nozzle 1080 can include seal 1083 between cooling nozzle 1080 and nozzle end piece 1082 to prevent coolant from bypassing nozzle end piece opening 1085. Nozzle end piece opening 1085 controls the pressure of the coolant passing through cooling nozzle 1080 into central annulus 1052. Nozzle end piece 1082 can be replaced to change the size of nozzle end piece opening 1085 or if nozzle end piece 1082 deteriorates due to coolant wear.

Cooling nozzle 1080 is secured to nozzle housing 1076. In one aspect, cooling nozzle 1080 is permanently fixed to nozzle housing 1076. In an alternate aspect, cooling nozzle 1080 can be detachably attached to nozzle housing 1076 through bolts, screws, fasteners, or other attachment means. In one aspect of the invention, an exterior surface of cooling nozzle 1080 includes threading so that cooling nozzle 1080 can be attached to nozzle housing 1076 by screwing cooling nozzle 1080 into nozzle housing 1076. In a further aspect of the invention, cooling nozzle 1080 can be permanently affixed to nozzle housing 1076.

Nozzle housing 1076 can be attached to base 1024. Nozzle housing 1076 can include an opening 1302 so that coolant can drain from nozzle housing 1076 into sump 1090. In one aspect of the invention, nozzle housing 1076 is detachably attached to base 1024 through bolts 1077. In another aspect of the invention, nozzle housing 1076 can be detachably attached to base 1024 through screws, latches, or other suitable fastening means. In a further aspect of the invention, a surface of nozzle housing 1076 and a surface of base 1024 can include threads such that the entirety of nozzle housing 1076 can be attached to base 1024 by screwing nozzle housing 1076 into base 1024.

A sump 1090 in the form of an open-topped vessel is attached to the underside of the base 1024 and extends into pit 1032. An opening of the sump 1090 is sealed from the ambient environment by the housing 1022. A coolant line 1092a runs from the outlet of the sump to the inlet of a coolant pump 1094. The coolant pump is located at the bottom of pit 1032. A coolant line 1092b runs from the outlet of the pump to a lower end of a heat exchange coil 1096 that coils along the stator 1064. A coolant line 1092c runs from the upper end of the coil to a heat exchanger 1098. A coolant line 1092d runs from the outlet of the heat exchanger 1098 to the base 1086 of the cooling nozzle 1080. A heat exchange fluid line 1100a runs through a flow control valve 1102 to the heat exchanger 1098 and a fluid line 1100b is connected to a heat exchange fluid outlet of the heat exchanger 1098.

A vacuum pump 1110 connects via vacuum line 1112 to the interior of the housing 1022. A radial air gap 1114 between the rotor 1062 and the stator 1064 communicates a vacuum in the housing around bearing assembly 1048 to the annulus 1052 of the drive shaft. The interface between the sump vessel and base 1024 is sealed so that a vacuum communicated to the sump is maintained. The flywheel rotor is operated in a partial vacuum to minimize air frictional losses and heating. However, the partial vacuum above the coolant surface in the sump 1090 requires that the pump 1094 be positioned sufficiently below the sump to provide a pressure head at the pump inlet that is high enough to avoid loss of flow and cavitation through the expected range of pump operating speeds.

Temperature sensor 1118 senses temperature of the stator 1064, temperature sensor 1120 senses the temperature of the bearing 1048, temperature sensor 1122 senses the temperature of the bearing 1046, temperature sensor 1123 senses the temperature of magnetic bearing 1150, and temperature sensor 1124 senses the temperature of coolant in the sump 1090. Flow sensor 1126 senses the speed at which coolant is pumped by the coolant pump 1094. Flow sensor 1128 senses the speed at which heat exchange fluid flows through heat exchanger 1098. Speed sensor 1130 senses the rotational speed of the flywheel 1040. Pressure sensor 1132 senses the pressure in the interior of housing 1022.

Figure 8:
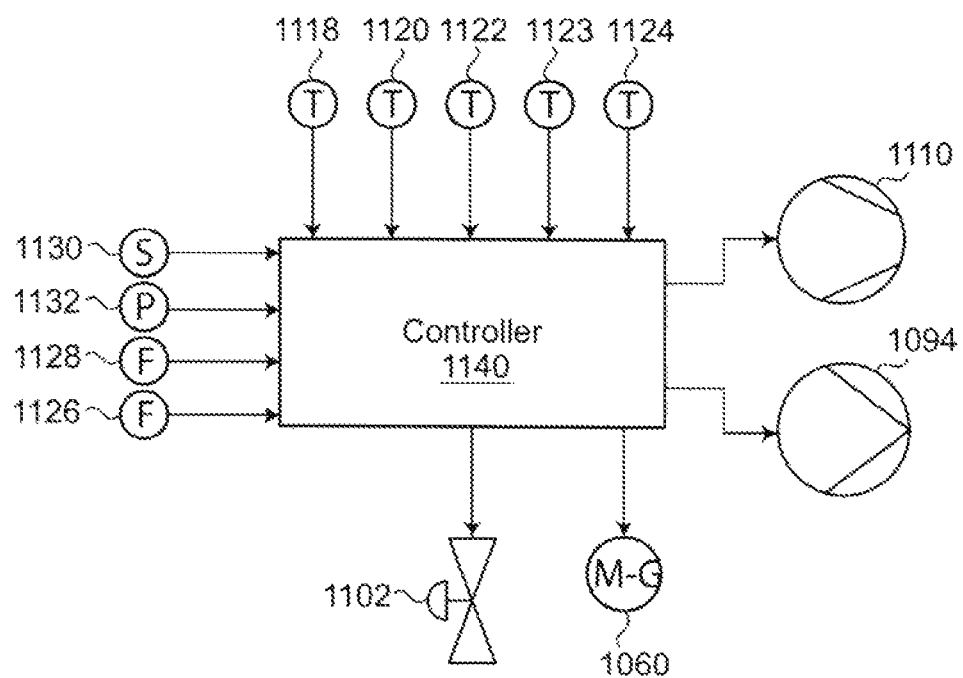
FIG. 8 is a schematic view of another system control apparatus.

Turning to FIG. 8, the various sensors input data into a controller 1140. The controller outputs control signals to the coolant pump 1094, vacuum pump 1110, flow control value 1102, and motor-generator 1060.

The coolant in the sump 1090, which is supplied to the cooling nozzle 1080, is a heat transfer fluid with a boiling temperature that is higher than the normal operating temperatures at the expected operating pressures (e.g., in a partial vacuum). A suitable heat transfer fluid in this regard is DURATHERM 600™ manufactured by Duratherm Extended Life Fluids, a division of Frontier Resource and Recovery Services Incorporated. DURATHERM 600™ is a petroleum-based, non-toxic, heat transfer fluid with a low vapour pressure and a high operating temperature.

In operation, the controller 1140 may excite the motor-generator 1060 to apply a torque to drive shaft 1050 and spin up flywheel 1040. Once the flywheel has been spun up to a target rotational speed—as determined by the controller based on a speed signal from speed sensor 1130—the excitation current to the motor-generator may be shut off and only intermittently applied to maintain the flywheel at its target speed. With the flywheel rotating within an operational speed window, an electrical load may be selectively applied to the motor-generator so that the flywheel powers the load by rotating the motor-generator. The flywheel rotor operates in a partial vacuum to minimize air frictional losses and heating. However, a significant amount of heat will be generated in the motor-generator 1060 due to its operation and further heat will be generated due to friction in the bearings 1046, 1048, and elsewhere in system 1020.

Removal of heat from the stator 1064 of the motor-generator 1060 is relatively straightforward, as heat may be removed via convection to the coolant in cooling coils 1096 and by conduction to sleeve 1068. On the other hand, removal of heat from the motor rotor 1062 is more challenging, as heat can only be removed from the rotor via forced convection in view of air gap 1114 and the vacuum environment.

Controller 1140 sets an initial speed of pumps 1094 and 1110 and an initial flow rate of heat exchange fluid through heat exchanger 1098 by setting the position of flow control valve 1102. With coolant pump 1094 operating, coolant is pumped from the sump 1090 through heat exchange coil 1096 and heat exchanger 1098 to cooling nozzle 1080. The coolant flows through the nozzle annulus 1081 and escapes through the nozzle end piece opening 1085, resulting in coolant spraying upwards and radially outwardly to contact the wall 1054 of the annulus 1052 of the drive shaft 1050. It will be apparent that, because the rotor 1062 is rotating, it naturally spreads the coolant so that it coats the annular wall of the rotor. As further coolant contacts the annulus wall, it tends to displace coolant already on the wall so that the displaced coolant descends toward the base of the annulus and falls through opening 1302 in nozzle housing 1076 back into the sump 1090. The constantly refreshed coolant on the wall 1054 of the annulus 1052 draws heat from this wall and, consequently, from components in thermal contact with wall 1054. The components directly abutting the annulus wall 1054 of the drive shaft 1050 are the motor-generator rotor 1062 and the bearing assembly 1048. Thus, these components are principal beneficiaries of the cooling of the annulus wall of the drive shaft 1050. However, as will be apparent, the motor-generator stator 1064, flywheel rotor 1042, support shaft 1044 and upper bearing assembly 1046 are all thermally coupled to the motor-generator rotor 1062, and so also benefit from the cooling of the annular wall of the rotor. Additionally, coolant flowing through the heat exchange coil 1096 directly cools the stator 1064 and indirectly cools components thermally coupled to the stator. The indirect cooling of the flywheel rotor through its thermal coupling to the rotor and stator of the motor-generator 60 is used to keep the flywheel below a temperature that would heat the magnetic bearing assembly to a point where the annular permanent magnet within the assembly would be damaged.

The heat exchanger 1098 cools the coolant exiting the coil 1096 before it reaches the cooling nozzle 1080, so that the coolant is at its coolest when sprayed by cooling nozzle 1080 into the annulus 1052. The coolant is under pressure between the outlet of the coolant pump 1094 and the cooling nozzle 1080, which raises the boiling point of the coolant and avoids risk of the coolant boiling, even at high temperatures. Thus, it is not important to ensure the coolant is at its coolest when within coil 1096. On the other hand, the coolant is under vacuum within the annulus such that its boiling point is significantly lower. Consequently, in circumstances where the coolant temperature exceeds operating norms, there might be a risk of the coolant reaching its boiling point within the annulus. If the coolant boiled, it would outgas in the annulus and degrade the vacuum, causing higher frictional drag on the flywheel rotor surface, thereby risking further temperature increase. By ensuring the coolant is at its coolest in the annulus, this risk is minimized.

The controller is input by temperature sensors 1118, 1120, 1122, 1123, and 1124. If the temperature at any of these sensors migrates above a pre-set upper limit, the controller may respond by one or more of increasing the speed of coolant pump 1094, increasing the flow rate of heat exchange fluid through the heat exchanger 1098 by re-setting the position of flow control valve 1102, and increasing the speed of the vacuum pump 1110. If the temperatures become too high, the controller could also refrain from exciting the motor-generator 1060, even when the speed of the flywheel fell below its operational window.

Giving an example, the vacuum pump may draw a vacuum of $10^{-2}$ Torr within the housing 1022 and the set point for the maximum temperature within the system may be 70° C., where the coolant chosen for the system 1020 will not boil below, say, 80° C. at $10^{-2}$ Torr.

In an embodiment, the pun p 1094 is located as far below the sump as practicable to maximize the coolant head and therefore the inlet pressure to the pump. This allows a higher maximum pump speed before a vacuum is drawn at the pump inlet.

In an embodiment, the base 1024 is a cast or wrought part. Coil 1096 can be formed by a machined or etched spiral groove on the inner wall of sleeve 1068, with a thin-walled inner sleeve press-fit to the inner wall of sleeve 1068.

While an example embodiment has been described, many modifications are possible, as described above with respect to FIGS. 1-4.

Other modifications will be apparent to those skilled in the art and, therefore, the invention is defined in the claims.

What is claimed is:

1. A cooled flywheel apparatus comprising:
a flywheel having an annular drive shaft connected to a flywheel rotor, the annular drive shaft extending below the flywheel rotor such that an annulus of the annular drive shaft opens downwardly;
a stationary cooling member for directing a coolant into the annulus of the annular drive shaft; and
a first cooling fluid line in fluid communication with the cooling member;
a sump positioned below and enclosing the annulus of the annular drive shaft, the sump being configured to receive the coolant from the annulus;
a coolant pump having an inlet at the sump and an outlet in fluid communication with the first cooling fluid line for pumping the coolant into the cooling member, the pump being positioned below the sump to provide a pressure head at the pump inlet;
a second cooling fluid line fluidly connecting the outlet of the cooling pump to a cooling coil; and
a third cooling fluid line fluidly connecting the cooling coil to an inlet of a heat exchanger,
wherein the stationary cooling member is connected to an outlet of the heat exchanger by the first cooling fluid line,
wherein the entirety of each of the first cooling fluid line, the second cooling fluid line and the third cooling fluid line is provided outside of the annular drive shaft.

2. The apparatus of claim 1, wherein the flywheel rotates about a vertical axis.

3. The apparatus of claim 1, wherein the cooling member includes perforations along its length and about its periphery for directing coolant out of the cooling member.

4. The apparatus of claim 1, wherein the cooling member includes an opening at its top end for directing coolant out of the cooling member.

5. The apparatus of claim 1, wherein the coolant is petroleum-based.

6. The apparatus of claim 1, further comprising a motor-generator having a motor-generator rotor attached to the annular drive shaft.

7. The apparatus of claim 6, wherein the motor-generator rotor is a sleeve abutting the annular drive shaft.

8. The apparatus of claim 7 further comprising:
a housing surrounding the flywheel and the motor-generator and sealing an opening of the sump from the ambient environment; and
a vacuum pump for drawing a vacuum within the housing.

9. The apparatus of claim 8, wherein the sump is sealed from an ambient environment by the housing to maintain the vacuum within the housing.

10. The apparatus of claim 8, further comprising a controller operatively connected to the coolant pump for controlling a speed of the coolant pump based on an input from a temperature sensor.

11. The apparatus of claim 10, wherein the controller is operatively connected to the vacuum pump for controlling an interior pressure of the housing.

12. The apparatus of claim 10, wherein the controller is operatively connected to the motor-generator.

13. A cooled flywheel energy storage system comprising:
a housing having an internal pressure at a partial vacuum;
a flywheel contained within the housing, the flywheel having an annular drive shaft;
a stationary cooling member for directing a coolant into an annulus of the annular drive shaft;
a coolant sump positioned below and enclosing the annulus of the annular drive shaft, the coolant sump being configured to receive the coolant from the annulus;
a first cooling fluid line in fluid communication with the cooling member;
a pump for pumping the coolant through the first cooling fluid line and the stationary cooling member, the pump being positioned below the coolant sump and the annular drive shaft;
a second cooling fluid line fluidly connecting the outlet of the pump to a cooling coil; and
a third cooling fluid line fluidly connecting the cooling coil to an inlet of a heat exchanger,
wherein the stationary cooling member is connected to an outlet of the heat exchanger by the first cooling fluid line,
wherein the entirety of each of the first cooling fluid line, the second cooling fluid line and the third cooling fluid line is provided outside of the annular drive shaft.

14. The cooled flywheel energy storage system of claim 13, wherein the coolant sump is sealed from an ambient environment by the housing to maintain the partial vacuum within the housing.

* * * * *